United States Patent [19]

Ohtsuka et al.

[11] Patent Number: 5,758,686
[45] Date of Patent: Jun. 2, 1998

[54] CONTROL VALVE ABNORMALITY DETECTION METHOD AND APPARATUS

[75] Inventors: Akira Ohtsuka; Chosei Kaseda, both of Tokyo, Japan

[73] Assignee: Yamatake-Honeywell Co., Ltd., Japan

[21] Appl. No.: 864,846

[22] Filed: May 29, 1997

[30] Foreign Application Priority Data

Jun. 6, 1996 [JP] Japan .................. 8-144011
Feb. 19, 1997 [JP] Japan .................. 9-034792

[51] Int. Cl.$^6$ ............................. F16K 31/12
[52] U.S. Cl. .................. 137/492.5; 137/492; 137/488
[58] Field of Search .................. 137/492.5, 492, 137/488

[56] References Cited

U.S. PATENT DOCUMENTS

| | | | |
|---|---|---|---|
| 4,240,463 | 12/1980 | Moore | 137/492.5 |
| 4,285,362 | 8/1981 | Taylor | 137/492.5 |
| 4,319,603 | 3/1982 | Snyder | 137/492.5 |
| 4,328,672 | 5/1982 | Zumstein | 137/492.5 |
| 4,617,958 | 10/1986 | Seidel et al. | 137/492.5 |
| 4,671,319 | 6/1987 | Namand | 137/492.5 |
| 5,029,609 | 7/1991 | Blok | 137/492.5 |
| 5,425,396 | 6/1995 | Wodeslavsky | 137/492.5 |
| 5,590,685 | 1/1997 | Johnson | 137/492.5 |
| 5,687,759 | 11/1997 | Tan | 137/492.5 |

FOREIGN PATENT DOCUMENTS

4-119275  4/1992  Japan.

*Primary Examiner*—Denise L. Ferensic
*Assistant Examiner*—Joanne Y. Kim
*Attorney, Agent, or Firm*—Blakely Sokoloff Taylor & Zafman

[57] ABSTRACT

In a control valve abnormality detection method of detecting abnormality in a control valve, a characteristic expression representing the relationship between three factors in the normal state of the control valve is pre-set. The three factors consist of the displacement of the valve stem, a driving force from the valve stem driving device which changes upon displacement of the valve stem, and the force of the fluid which acts on one end of the valve stem through the valve. The three factors are detected on the basis of measurement result. On the basis of two factors selected from the detected three factors, the estimated value of one factor, which is not selected, is calculated by using the pre-set characteristic expression. The detected value of one factor, which is not selected, is compared with the calculated estimated value, and abnormality in the control valve is determined on the basis of the comparison result. A control valve abnormality detection apparatus is also disclosed.

12 Claims, 6 Drawing Sheets

CONTROL VALVE ABNORMALITY DETECTION METHOD AND APPARATUS

BACKGROUND OF THE INVENTION

The present invention relates to a control valve abnormality detection method and apparatus for detecting abnormality in a control valve which operates upon movement of a valve stem to control the opening of a channel.

Figure 5:
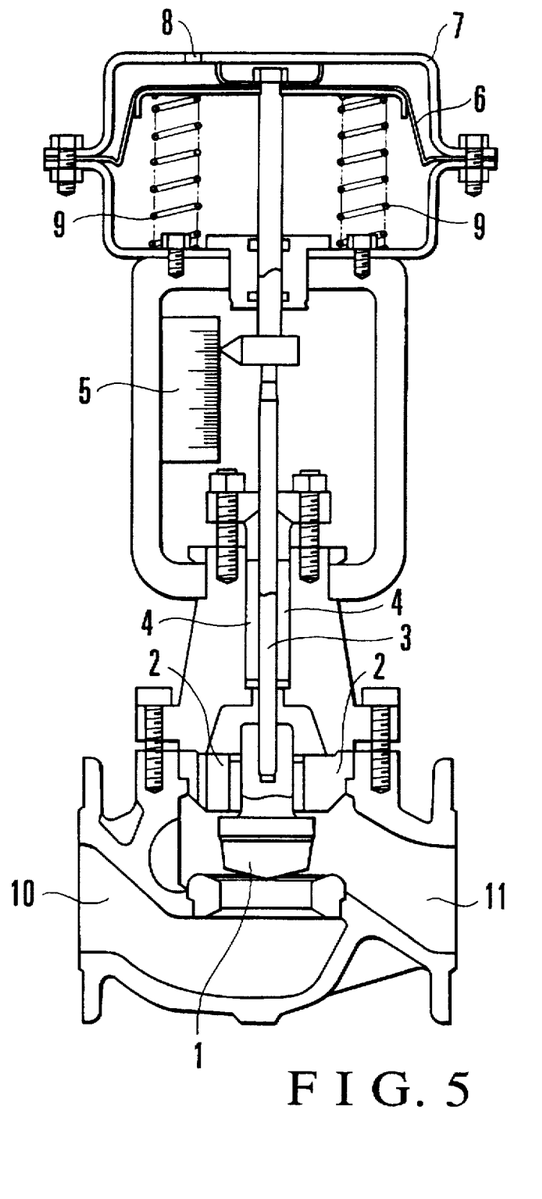
FIG. 5 is a sectional view showing the structure of a known control valve used in the present invention.

A control valve is generally used for flow rate control in a flow rate process of a liquid, a gas, or the like. FIG. 5 shows the structure of a known control valve. Referring to FIG. 5, a valve plug 1 is guided in the advancing/retreating direction by a guide ring 2 to open/close the channel upon movement of a valve stem 3. The valve stem 3 is driven by a driving section constituted by a diaphragm 6, a diaphragm case 7, and the like, and hermetically held by a ground packing 4 serving as a sealing member.

The operation of the control valve having the above structure will be briefly described next. When air is supplied through an air supply port 8, the diaphragm 6 is displaced against the biasing force of a spring 9 to cause the valve stem 3 to advance. With the advance of the valve stem 3, the valve plug 1 mounted on the distal end of the valve stem 3 moves in a direction to close the channel. As a result, the channel is narrowed to reduce the amount of fluid flowing from an inlet 10 to an outlet 11.

When the pressure of air supplied through the air supply port 8 decreases, the diaphragm 6 is restored to its initial position by the spring 9 to cause the valve stem 3 to retreat. With the retreat of the valve stem 3, the valve plug 1 mounted on the distal end of the valve stem 3 moves in a direction to open the channel. As a result, the channel is broadened to increase the amount of fluid flowing from the inlet 10 to the outlet 11.

Figure 7:
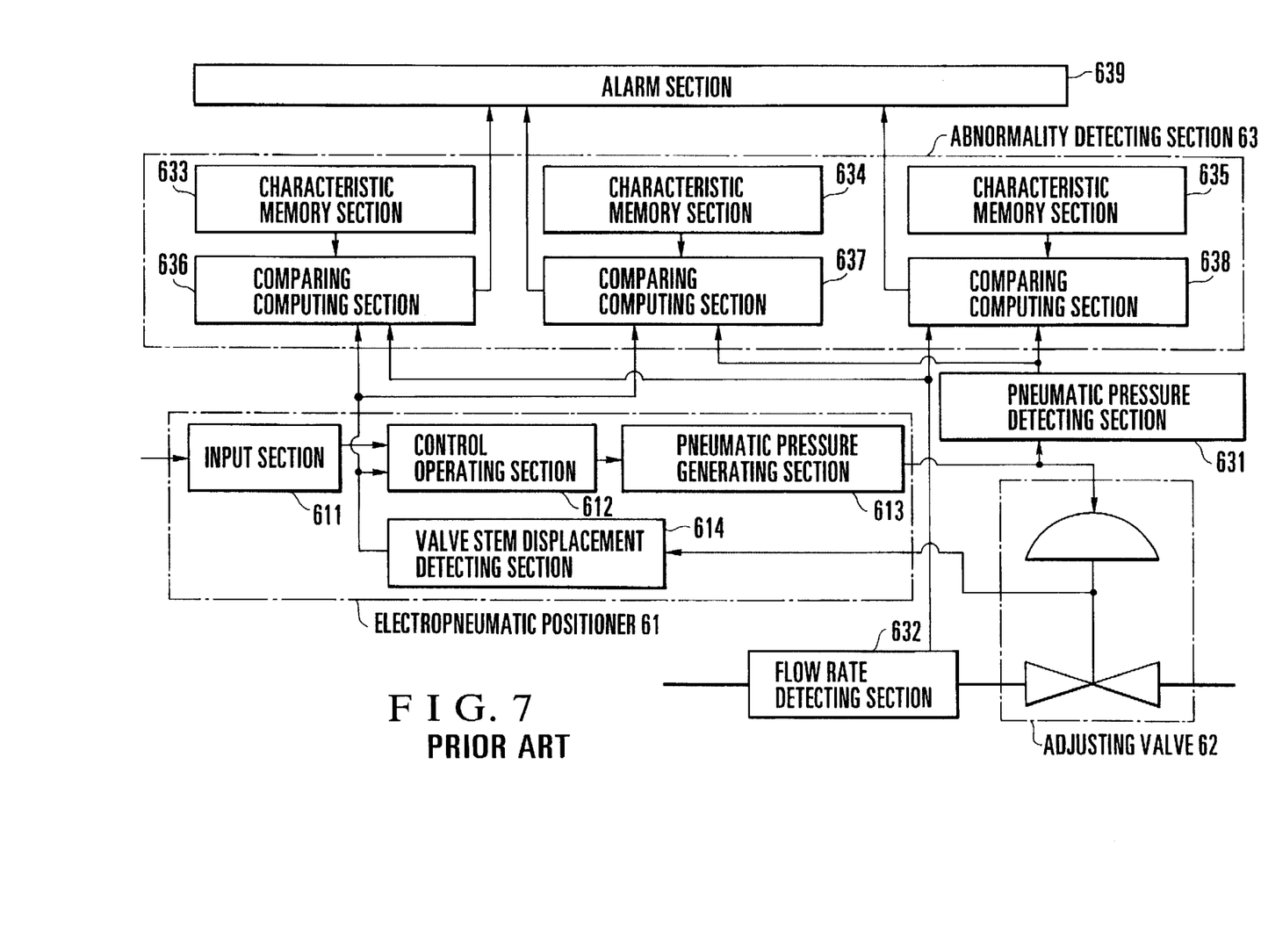
FIG. 7 is a block diagram showing the arrangement of a conventional adjusting valve (control valve) abnormality detection system.

As an abnormality detection system for such a control valve, for example, the system disclosed in Japanese Patent Laid-Open No. 4-119275 is available. This system is designed to detect abnormality on the basis of, e.g., the relationship between the displacement of the valve stem and the pressure of air supplied through the air supply port. FIG. 7 shows the arrangement of the conventional adjusting valve (control valve) abnormality detection system disclosed in the above reference. Referring to FIG. 7, the conventional system comprises an electropneumatic positioner 61, an adjusting valve (control valve) 62 which is controlled by the electropneumatic positioner 61, and an abnormality detecting section 63.

In the electropneumatic positioner 61, the desired value input is input to a control operating section 612 through an input section 611. The control operating section 612 controls a pneumatic pressure generating section 613 in accordance with the input desired value. The pneumatic pressure generating section 613 drives the adjusting valve 62 by causing the diaphragm 6 to advance by supplying air through the air supply port 8 in FIG. 5. The control operating section 612 monitors the displacement of the valve stem 3 (to be referred to as a valve stem displacement hereinafter) which is detected by a valve stem displacement detecting section 614, and stops the operation of the pneumatic pressure generating section 613 when the displacement becomes equal to the desired value.

In the abnormality detecting section 63, a pneumatic pressure detecting section 631 detects the pressure of air generated by the pneumatic pressure generating section 613. In addition, a flow rate detecting section 632 detects the fluid flow rate controlled by the adjusting valve 62. A characteristic storage section 633 stores characteristics indicating the relationship between the valve stem displacement detected by the valve stem displacement detecting section 614 and the flow rate detected by the flow rate detecting section 632 while the adjusting valve 62 is in a normal state. A characteristic memory section 634 stores characteristics indicating the relationship between the valve stem displacement and the pneumatic pressure detected by the pneumatic pressure detecting section 631 while the adjusting valve 62 is in the normal state. A characteristic memory section 635 stores characteristics indicating the relationship between the flow rate and the pneumatic pressure while the adjusting valve 62 is in the normal state.

A comparing computing section 636 compares the relationship between the valve stem displacement detected by the valve stem displacement detecting section 614 and the flow rate detected by the flow rate detecting section 632 with the characteristics in the normal state which are stored in the characteristic memory section 633. If the relationship detected by the valve stem displacement detecting section 614 deviate from the characteristics in the normal state, the comparing computing section 636 sends a notification of the occurrence of abnormality to an alarm section 639. A comparing computing section 637 compares the relationship between the valve stem displacement and the pneumatic pressure detected by the pneumatic pressure detecting section 631 with the characteristics in the normal state which are stored in the characteristic memory section 634. If the relationship detected by the pneumatic pressure detecting section 631 deviates from the characteristic in the normal state, the comparing computing section 637 sends a notification of the occurrence of abnormality to the alarm section 639.

Similarly, a comparing computing section 638 compares the relationship between a detected flow rate and a detected pneumatic pressure with the characteristics stored in the characteristic memory section 635. If the detected relationship deviates from the characteristics in the normal state, the comparing computing section 638 sends a notification of the occurrence of abnormality to the alarm section 639. Upon reception of the notification of the occurrence of abnormality from each of the comparing computing sections 636 to 638, the alarm section 639 generates an alarm indicating the occurrence of abnormality in the adjusting valve 62.

In the above conventional system, the relationship between pneumatic pressure and valve stem displacement is uniformly determined. Similarly, the relationship between pneumatic pressure and fluid flow rate is uniformly determined, and so is the relationship between valve stem displacement and fluid flow rate. For this reason, an abnormality alarm may be erroneously generated even if the adjusting valve 62 is in the normal state. That is, in the conventional system, when the relationship between a measured valve stem displacement and a measured pneumatic pressure deviates from a set characteristic expression, an alarm is generated.

Since the set relationship between valve stem displacement and pneumatic pressure is based on the flow rate of fluid in a reference data measurement process, a change in the flow rate of fluid causes a slight change in the relationship between valve stem displacement and pneumatic pressure. For this reason, when the state of flow rate greatly differs from the fluid state from which the set characteristic expression was obtained, abnormality is determined regardless of whether the adjusting valve 62 is in the normal state.

SUMMARY OF THE INVENTION

It is an object of the present invention to provide a control valve abnormality detection method and apparatus which can accurately detect abnormality in a control valve even if the controlled state of a fluid or the state of fluid flow rate varies.

In order to achieve the above object, according to the present invention, there is provided a control valve abnormality detection method of detecting abnormality in a control valve constituted by a valve for opening/closing a channel through which a fluid flows, a valve stem having one end coupled to the valve and capable of advancing/retreating in an axial direction, and a valve stem driving device for causing the valve stem to advance/retreat by applying a driving force to the other end of the valve stem, comprising the steps of pre-setting a characteristic expression representing a relationship between three factors, in a normal state of the control valve, which consist of a displacement of the valve stem, a driving force from the valve stem driving device which changes upon displacement of the valve stem, and a fluid force of the fluid which acts on one end of the valve stem through the valve, detecting the three factors on the basis of a measurement result, calculating, on the basis of two factors selected from the detected three factors, an estimated value of one factor, which is not selected, on the basis of the two selected factors by using the pre-set characteristic expression, and comparing a detected value of one factor, which is not selected, with the calculated estimated value, and determining abnormality in the control valve on the basis of the comparison result.

DESCRIPTION OF THE PREFERRED EMBODIMENTS

The present invention will be described in detail below with reference to the accompanying drawings.

Figure 1:
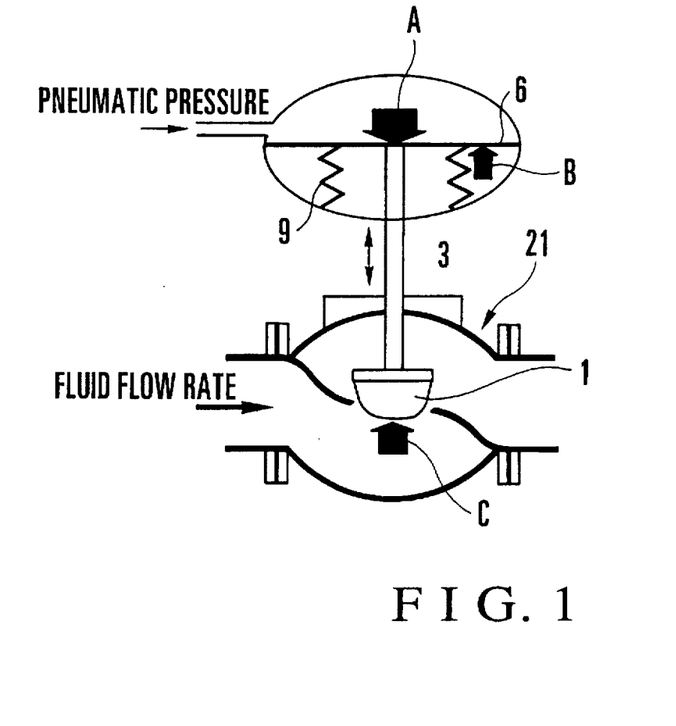
FIG. 1 is a schematic view showing the structure of a control valve in FIG. 2 and FIG. 5.

The present invention will be briefly described first. As shown in FIG. 1, the relationship between the forces acting on a control valve in the valve stem core direction is balanced by a driving force A based on an operating pneumatic pressure and acting on a valve stem 3, a biasing force B of a spring 9 for pushing back a diaphragm 6, and a fluid force C of a fluid which acts on a valve plug 1.

In this case, a force Ff of a fluid which acts on the valve stem 3 is the sum of the pressure of the fluid passing through a control valve 21 which acts around the valve plug 1, and a force based on a change in fluid momentum. The relationship between a fluid flow rate Q and a difference pressure $\Delta P$ between the upstream and downstream pressures generated by the fluid having the force Ff and acting on the control valve 21 (valve plug 1) can be approximately expressed by equation (1):

$$Ff = C_1 \times \Delta P + C_2 Q \tag{1}$$

Alternatively, the following equation (1A) may be used.

$$Ff = C_1 \times \Delta P + C_2 Q + C_3 Q^2 \tag{1A}$$

According to equation (1A), if constants $C_1$, $C_2$, and $C_3$ are obtained in advance, the force Ff can be calculated by detecting the difference pressure $\Delta P$ and the flow rate Q.

In this case, if a relationship $C_v(x)$ between a control valve capacity $C_v$ given by equation (2) and a valve stem displacement x, i.e., flow rate characteristics, is known, the force Ff can be expressed by equation (1), (3), or (4) from equation (2):

$$C_v = Q/(\Delta P)^{1/2} \tag{2}$$

$$\begin{aligned} Ff &= C_1 \Delta P + C_2 Q \\ &= C_1 (Q/C_v(x))^2 + C_2 Q \end{aligned} \tag{3}$$

$$\begin{aligned} Ff &= C_1 \Delta P + C_2 Q \\ &= C_1 \Delta P + C_2 C_v(x) \cdot (\Delta P)^{1/2} \end{aligned} \tag{4}$$

With the use of equation (3), the force of the fluid which acts on the valve stem can be detected by detecting a fluid flow rate. With the use of equation (4), the force of the fluid which acts on the valve stem 3 can be calculated by detecting the upstream/downstream difference pressure at the control valve 21.

The force Ff of the fluid which acts on the valve stem 3 can be approximately expressed by equation (1B) by using upstream and downstream pressures P1 and P2 at the control valve 21 and the fluid flow rate Q:

$$Ff = C1 \times P1 + C2 \times P2 + C3 \times Q \tag{1B}$$

According to equation (1B), if constants C1, C2, and C3 are obtained in advance, the force Ff of the fluid which acts on the valve stem 3 can be calculated by detecting the upstream and downstream pressures P1 and P2 and the flow rate Q.

From equation (2) and $\Delta P = P1 - P2$, equation (1B) is expressed by equation (4A):

$$\begin{aligned} Ff &= C1 \times P1 + C2 \times P2 + C3 \times Q \\ &= C1 \times P1 + C2 \times P2 + C3 \times C_v(x) \times (P1 - P2)^{1/2} \end{aligned} \tag{4A}$$

According to equation (4A), the force of the fluid which acts on the valve stem 3 can be calculated by detecting the upstream and downstream pressures at the control valve 21.

The relationship between the force of the fluid which acts on the valve stem 3, the pressure of the fluid passing through the control valve 21, and the fluid flow rate varies depending on the type of the control valve 21. In some cases, the force of the fluid which acts on the valve stem 3 can be expressed as a function of only the pressure of the fluid passing through the control valve 21 or the fluid flow rate. In other cases, the pressure of the fluid can be expressed as a function of only the upstream or downstream pressure at the control valve 21.

That is, the force of the fluid which acts on the valve stem 3 can be detected by detecting the upstream/downstream difference pressure at the control valve 21, the upstream and downstream pressures at the control valve 21, or the fluid flow rate. Consider a case in which the force of the fluid which acts on the control valve 21 can be approximated by the upstream/downstream difference pressure at the control valve 21 and the fluid flow rate.

In this case, the relationship between the force of the fluid which acts on the valve stem 3 and the upstream/downstream difference pressure at the control valve 21 or the fluid flow rate is prepared as the characteristic equation expressed by equation (5). If the control valve 21 is designed to be pneumatically driven, the following characteristic equation is established:

$$PS = K(x-x_0) + C_1\Delta P + C_2 Q \tag{5}$$

where P is the operating pneumatic pressure, x is the valve stem displacement, $\Delta P$ is the upstream/downstream difference pressure at the control valve 21, S is the cross-sectional area (constant 1) of the diaphragm, K is a constant (constant 2) representing the spring rigidity, $x_0$ is the initial value (constant 3) of the valve stem displacement, and $C_1$ and $C_2$ are constants (constants 4 and 5) representing the fluid forces.

According to equation (5), the relationship between the following three states is expressed as a characteristic equation in consideration of the equilibrium relationship between the forces acting in the axial direction of the valve stem 3 of the control valve 21:

I. a valve stem displacement driving force PS corresponding to a pneumatic pressure;

II. a biasing force $K(x-x_0)$ of the spring 9 which corresponds to the spring contraction amount determined by the displacement of the valve stem 3; and III. a fluid force $C_1\Delta P + C_2 Q$ acting on the valve stem displacement when a fluid flows.

An estimated pneumatic pressure is obtained from a measured valve stem displacement and a measured flow rate according to equation (5). The obtained estimated value is compared with an actually measured pneumatic pressure. If it is determined upon comparison that the difference between the two values is a predetermined value or more, it is determined that abnormality has occurred in the control valve 21.

If only a fluid flow rate is to be measured without measuring the upstream/downstream difference pressure at the control valve 21, the relationship given by equation (6) may be used as a characteristic equation:

$$\begin{aligned} PS &= K(x-x_0) + C_1\Delta P + C_2 Q \\ &= K(x-x_0) + C_1(Q/C_v(x))^2 + C_2 Q \end{aligned} \tag{6}$$

where $C_v(x)$ is the flow rate characteristics.

When the upstream/downstream difference pressure at the control valve 21 is to be measured without measuring a fluid flow rate, the relationship given by equation (7) may be used as a characteristic equation:

$$\begin{aligned} PS &= K(x-x_0) + C_1\Delta P + C_2 \\ &= K(x-x_0) + C_1\Delta P + C_2 C_v(x) \cdot (\Delta P)^{1/2} \end{aligned} \tag{7}$$

According to equation (7), it suffices if constants 1 to 5 and the relationship between the valve capacity $C_V$ and the valve stem displacement x, i.e., the flow rate characteristics $C_v(x)$, are prepared.

When the force of the fluid which acts on the valve stem 3 is to be approximated by using the upstream and downstream pressures at the control valve 21 and the fluid flow rate, equation (5A) may be used as a characteristic equation:

$$PS = K(x-x_0) + C1 \times P1 + C2 \times P2 + C3 \times Q \tag{5A}$$

where P1 is the upstream pressure at the control valve 21, P2 is the downstream pressure at the control valve 21, and C1, C2, and C3 are the constants (constants 4, 5, and 6) representing the fluid force.

When the upstream and downstream pressures at the control valve 21 are to be measured without measuring a fluid flow rate, equation (7) may be used as a characteristic equation:

$$\begin{aligned} PS &= K(x-x_0) + C1 \times P1 + C2 \times P2 + C3 \times Q \\ &= K(x-x_0) + C1 \times P1 + C2 \times P2 + C3 \times C_v(x) \times \\ & \quad (P1-P2)^{1/2} \end{aligned} \tag{7A}$$

According to equation (7A), it suffices if constants 1 to 6 and the relationship between the valve capacity $C_v$ and the valve stem displacement x, i.e., the flow rate characteristics $C_v(x)$, are prepared.

Figure 2:
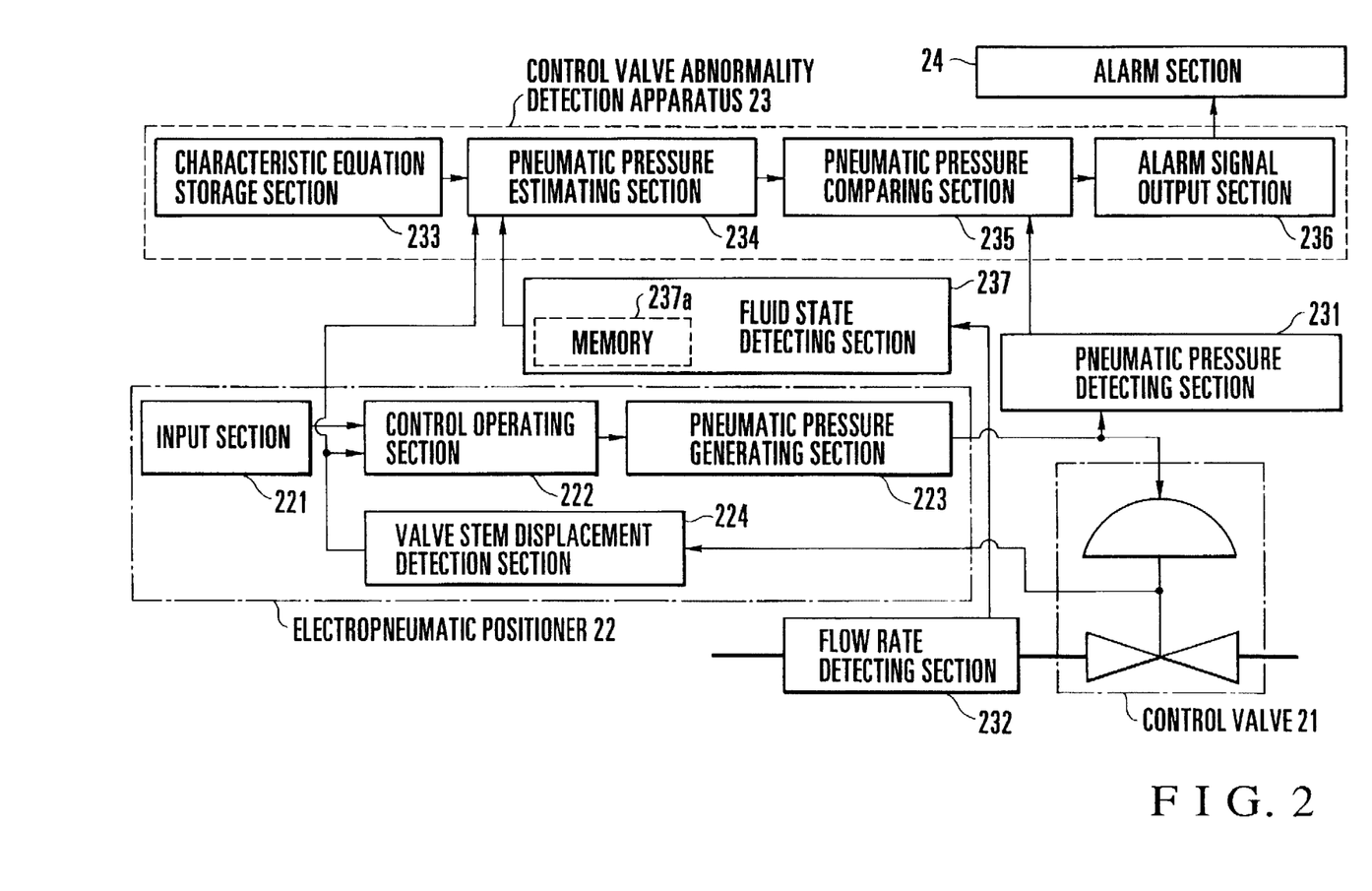
FIG. 2 is a block diagram showing the arrangement of a control valve abnormality detection system according to the first embodiment of the present invention.

FIG. 2 shows the arrangement of a control valve abnormality detection system according to the first embodiment of the present invention, and more specifically, an arrangement designed to approximate the force of a fluid which acts on the valve stem 3 by using a fluid flow rate. Referring to FIG. 2, the control valve abnormality detection system comprises an electropneumatic positioner 22 for driving/controlling the control valve 21, a control valve abnormality detection apparatus 23, and an alarm section 24.

In the electropneumatic positioner 22, a desired value is input to a control operating section 222 through an input section 221. The control operating section 222 controls a pneumatic pressure generating section 223 in accordance with the input desired value. The pneumatic pressure generating section 223 drives the control valve 21 by causing the diaphragm 6 to advance by supplying air through an air supply port 8 in FIG. 5. The control operating section 222 monitors the valve stem displacement detected by a valve stem displacement detecting section 224, and stops the operation of the pneumatic pressure generating section 223 when the detected valve stem displacement becomes equal to the desired value.

A pneumatic pressure detecting section 231 detects the pneumatic pressure generated by the pneumatic pressure generating section 223. A flow rate detecting section 232 detects the fluid flow rate controlled by the control valve 21. A fluid state detecting section 237 has a memory 237a in which the relation between the force of the fluid which acts on the valve stem 3 and the fluid flow rate is stored in advance. The fluid state detecting section 237 obtains the force of the fluid which acts on the valve stem 3, i.e., the fluid force, from the fluid flow rate detected by the flow rate detecting section 232 by using the stored relation.

In the control valve abnormality detection apparatus 23, a pneumatic pressure estimating section 234 calculates an estimated pneumatic pressure from the fluid force detected by the fluid state detecting section 237 and the valve stem displacement detected by the valve stem displacement detecting section 224 by using the above characteristic equation stored in a characteristic equation storage section 233.

A pneumatic pressure comparing section 235 compares the pneumatic pressure detected by the pneumatic pressure detecting section 231 with the estimated pneumatic pressure calculated by the pneumatic pressure estimating section 234. When the pneumatic pressure comparing section 235 determines on the basis of the comparison result that the difference between the detected pneumatic pressure and the estimated pneumatic pressure is a predetermined value, e.g., 5% or more of the operation range, the pneumatic pressure comparing section 235 notifies an alarm signal output section 236 that abnormality has occurred in the control valve 21. Upon reception of the notification of the abnormality in the control valve 21, the alarm signal output section 236 outputs an alarm signal to the alarm section 24. The alarm section 24 generates an alarm indicating that abnormality has occurred in the control valve 21. Note that the above predetermined value may be a value determined on the basis of pressure measurement errors or a value determined on the basis of variations in normal data acquired in a predetermined time interval.

In the first embodiment shown in FIG. 1, the force of the fluid which acts on the valve stem 3 can be approximated by the fluid flow rate. However, the present invention is not limited to this. As described above, in practice, the force Ff of the fluid which acts on the valve stem 3 is the sum of the pressure of the fluid passing through the control valve 21 which acts around the valve plug 1 and a force based on a change in fluid motion.

Figure 6:
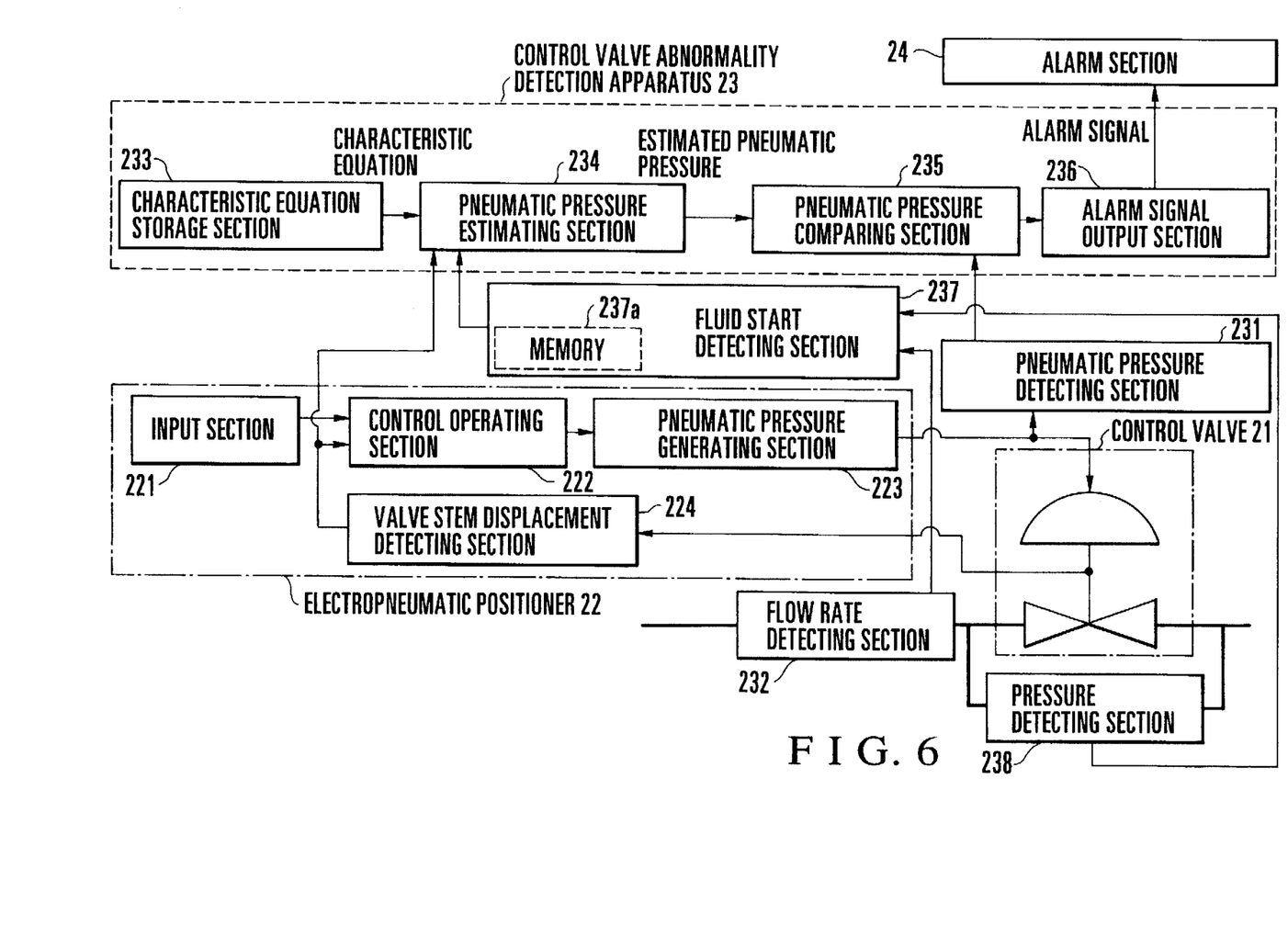
FIG. 6 is a block diagram showing the arrangement of a control valve abnormality detection system according to the second embodiment of the present invention.

In the second embodiment of the present invention in FIG. 6, in addition to the arrangement in FIG. 2, a pressure detecting section 238 for detecting pressures (upstream and downstream pressures) at the upstream and downstream channels of a control valve 21 is connected in tandem with a control valve 21. According to this arrangement, a fluid force is obtained by a fluid state detecting section 237 by using the upstream and downstream pressures at the control valve 21, detected by the pressure detecting section 238, in addition to the fluid flow rate detected by a flow rate detecting section 232. The relation between the fluid force and the upstream and downstream pressures at the control valve 21 is stored in a memory 237a of the fluid state detecting section 237 in advance.

In the second embodiment, if the force of the fluid which acts on a valve stem 3 can be approximated by using the difference (upstream/downstream difference pressure) between the pressures at the upstream and downstream channels of the control valve 21, a fluid force may be obtained by the fluid state detecting section 237 by using only the upstream and downstream pressures at the control valve 21 which are detected by the pressure detecting section 238.

Alternatively, it suffices if only the upstream or downstream pressure at the control valve 21 which is detected by the pressure detecting section 238 is used. In this case, the relation between the fluid force and the upstream or downstream pressure at the control valve 21 is stored in the memory 237a of the fluid state detecting section 237 in advance.

Furthermore, the upstream/downstream difference pressure obtained from the upstream and downstream pressures at the control valve 21 which are detected by the pressure detecting section 238 may be used. In this case, the relation between the fluid force an the upstream/downstream difference pressure at the control valve 21 is stored in the memory 237a of the fluid state detecting section 237 in advance.

Figure 3:
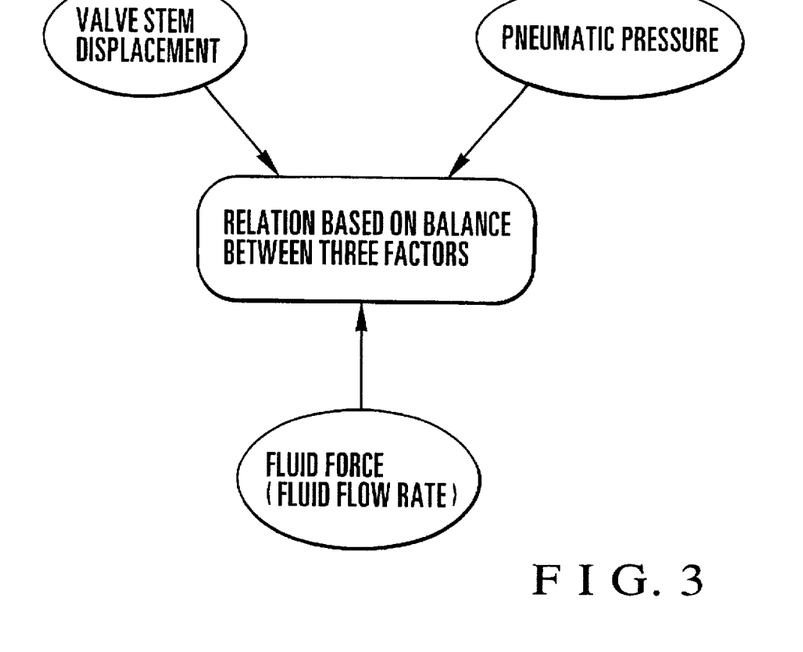
FIG. 3 is a view for explaining the relationship between the three factors in FIG. 1, i.e., the pneumatic pressure, the valve stem displacement, and the fluid force.

As described above, according to the first and second embodiments, as shown in FIG. 3, abnormality in the control valve 21 is detected by using the relation based on the balance between the pneumatic pressure, the valve stem displacement, and the fluid force. If the force of the fluid which acts on the valve stem 3 can be approximated by using the upstream/downstream difference pressure at the control valve 21, or the fluid flow rate, abnormality in the control value is detected by using the relation based on the balance between the pneumatic pressure, the valve stem displacement, and the fluid flow rate.

As described above, unlike the conventional system designed to use the relationship between only two of the above three factors, even if the controlled state of a fluid greatly varies, abnormality in the control valve 21 can be accurately detected without detecting this state as abnormality.

In each embodiment described above, an estimated pneumatic pressure is calculated by using a fluid force and a valve stem displacement. However, the present invention is not limited to this. In addition, when the fluid force can be approximated by using the upstream/downstream difference pressure at the control valve 21 or the fluid flow rate, an estimated operation pneumatic pressure is calculated by using the fluid flow rate and the valve stem displacement. However, the present invention is not limited to this. For example, an estimated fluid force (the force of the fluid which acts on the valve stem) may be calculated by using the pneumatic pressure (valve stem driving force) and the valve stem displacement, and the calculated estimated fluid force may be compared with a detected fluid force. In addition, when a fluid force can be approximated by using the upstream/downstream difference pressure at the control valve 21 or the fluid flow rate, an estimated fluid flow rate may be calculated by using the pneumatic pressure and the valve stem displacement, and the calculated estimated fluid flow rate may be compared with a detected fluid flow rate.

Furthermore, an estimated valve stem displacement may be calculated by using the pneumatic pressure and the fluid force, and the calculated estimated valve stem displacement may be compared with a measured valve stem displacement. In this case as well, when a fluid force can be approximated by using the upstream/downstream difference pressure at the control valve 21 or the fluid flow rate, an estimated valve stem displacement may be calculated by using the pneumatic pressure and the fluid flow rate, and the estimated valve stem displacement may be compared with a measured valve stem displacement.

Figure 4:
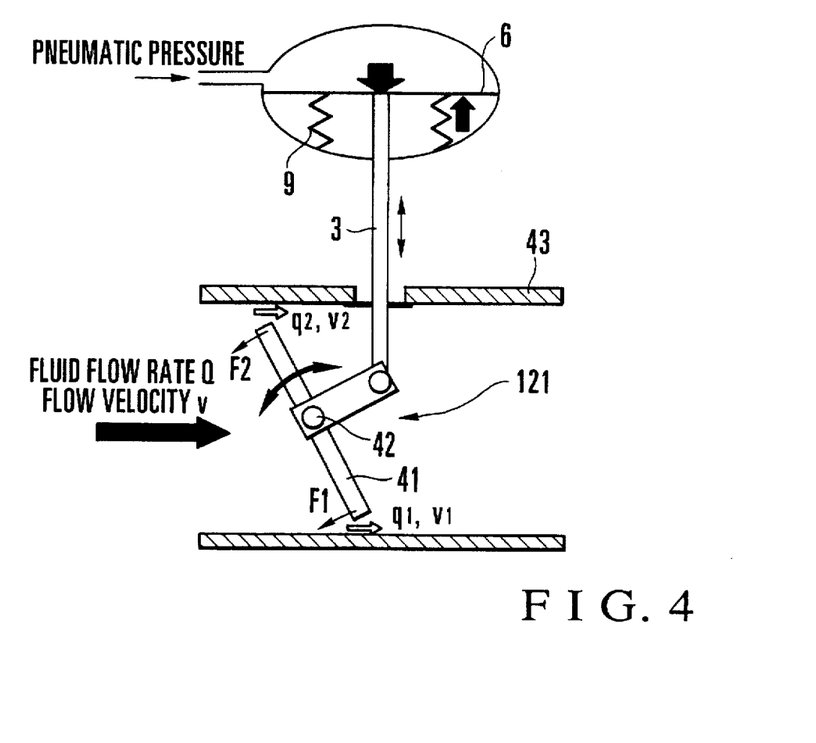
FIG. 4 is a sectional view schematically showing the structure of a control value of a butterfly valve type.

In each embodiment described above, the control valve 21 is of the type that is designed to control the flow rate by using the valve plug 1 which advances/retreats. However, the present invention is not limited to this. For example, as shown in FIG. 4, the present invention can be applied to a control valve 121 having an opening/closing valve called a butterfly valve. In this control valve 121, a valve vane 41 pivots about a shaft 42 upon advance/retreat of the valve stem 3, thereby controlling the flow rate of a fluid flowing in a tube 43. In this case, as a characteristic expression, an equation associated with the torques balanced around the shaft 42 may be used.

In the case of the butterfly valve in FIG. 4 as well, similarly to the control valve 21 designed to control the flow rate by using the valve plug 1 which advances/retreats, the force of the fluid which acts on the valve vane 41 can be regarded as the sum of the pressure of the fluid passing through the control valve 121 which acts around the valve vane 41 and a force based on a change in fluid momentum. Referring to FIG. 4, if the fluid flows in the tube 43 at a flow rate Q and a flow velocity v, a difference pressure is generated between the front and rear portions of the valve vane 41. The forces based on the upstream/downstream difference pressure at the control valve 121 are equal at the upper and lower portions of the valve vane 41. In consideration of the balance between the torques around the shaft 42, no torque is generated around the shaft 42 by the upstream/downstream difference pressure at the control valve 121.

Flow velocities $v_1$ and $v_2$ of the fluid passing through the gaps between the two end portions of the valve vane 41 and the tube 43 are much larger than the flow velocity v at the fluid flow rate Q. That is, in these regions, the momentum of the fluid changes. For this reason, the two end portions of the valve vane 41 receive reactions $F_1$ and $F_2$.

When the fluid flows in a direction along the valve vane 41, it is apparent from the application of the rule of fluid momentum in the direction along the valve vane 41 that there is a difference between fluid flow rates $q_1$ and $q_2$ at the downstream and upstream end portions of the valve vane 41. Therefore, $q_1 > q_2$ and $v_1 > v_2$. That is, the degree of change in momentum is higher at the downstream end portion of the valve vane 41 than the upstream end portion; and $F_1 > F_2$.

That is, forces act on the valve vane 41 in its rotating direction when the fluid flows, and these forces are associated with the fluid force. In the control valve 121, if, therefore, an expression associated with the torques balanced around the shaft 42 owing to the above inequality, $F_1 > F_2$, is used as a characteristic expression, abnormality can be detected as in the case of the control valve 21.

In the case of this butterfly valve, it suffices if attention is paid to the relationship between the force Ff of the fluid which acts on the valve stem 3 and the fluid flow rate. This relationship can be approximately expressed by equation (8):

$$Ff = C_2 Q \tag{8}$$

According to equation (8), if the constant $C_2$ is obtained in advance, the force Ff can be detected by detecting the flow rate Q.

Note that the force Ff may be given by $$Ff = C_2 Q + C_3 Q^2 \tag{8A}$$

According to equation (8A), if the constants $C_2$ and $C_3$ are obtained in advance, the force Ff can be detected by detecting the flow rate Q.

In addition, the force Ff can be given by $$Ff = C_3 Q^2 \tag{8B}$$

The relationship between the force of the fluid which acts on the valve stem 3 and the fluid flow rate is prepared as a characteristic equation such as equation (9). This characteristic equation is used when the control valve 121 is pneumatically driven.

$$PS = K(x - x_0) + C_2' Q \tag{9}$$

where P is the pneumatic pressure, x is the valve stem displacement, Q is the fluid flow rate, S is the cross-sectional area of the diaphragm, K is a constant (constant 2) representing the spring rigidity, $x_0$ is the initial valve stem displacement (constant 3), and $C_2'$ is a constant (constant 5) representing the fluid force.

Equation (9) approximately indicates that the torques around the shaft 42, i.e., the torque generated around the shaft 42 by the valve stem driving force and the torque generated around the shaft 42 by the fluid force are kept in balance.

In this case, an estimated pneumatic pressure is obtained from a measured valve stem displacement and a measured flow rate by using equation (9), and the estimated pneumatic pressure is compared with an actually measured pneumatic pressure. If it is determined on the basis of this comparison that the difference between the two values is a predetermined value or more, it is determined that abnormality has occurred in the control valve 121 constituted by the butterfly valve. Characteristic equation (9) is stored in the characteristic equation storage section 233 in FIG. 2 in advance.

As has been described above, according to the present invention, when the balance between the valve stem displacement, the driving force that is applied to one end of the valve stem and changes upon displacement of the valve stem, and the fluid force of the fluid which acts on the other end of the valve stem through the valve deviates from that in the normal state, it is determined that abnormality has occurred. For this reason, even if the controlled state greatly changes such that the state of the fluid flow rate greatly differs from the flow rate state obtained from a predetermined characteristic expression, abnormality in the control valve can be accurately detected.

In addition, according to the present invention, with the use of the arrangement designed to detect a driving force (pneumatic pressure), a valve stem displacement, a fluid flow rate, and the pressure of the fluid (the upstream and downstream pressures at the control valve or the upstream/downstream difference pressure), the cause of abnormality can be specified to a certain degree. More specifically, a valve stem displacement, a fluid flow rate, and the pressure of the fluid are detected, and the relationship between the control valve capacity calculated from the fluid flow rate and the upstream/downstream difference pressure at the control valve and the valve stem displacement is monitored. With this operation, a change in flow rate characteristics is detected to accurately obtain a desired control valve capacity. This change in flow rate characteristics is caused when, for example, the valve plug wears. By detecting this change in flow rate characteristic, therefore, abnormality in the control valve, e.g., valve plug wear, can be detected.

A fluid force is obtained from a fluid flow rate and a fluid pressure. In this case, the relationship between the control valve capacity and the valve stem displacement, i.e., the flow rate characteristic expression, is not used as a characteristic equation. For this reason, a change in flow rate characteristics is not detected to detect abnormality. In detecting abnormality, therefore, abnormality caused by a change in flow rate characteristics is not detected. However, since a fluid flow rate and the upstream/downstream difference pressure at the control value are measured, flow rate characteristics can be calculated from these measurement values.

If, therefore, a change in flow rate characteristics is detected from a measured fluid flow rate and a measured upstream/downstream difference pressure at the control value, but no abnormality is detected from the driving force, the valve stem displacement, the fluid flow rate, and the fluid pressure, it can be determined that abnormality has occurred at a portion that causes a change in flow rate characteristics. In contrast to this, if abnormality is detected from the driving force, the valve stem displacement, the fluid flow rate, and the fluid pressure, it can be determined that abnormality has occurred at a portion that causes no change in flow rate characteristics.

As described above, when a driving force (pneumatic pressure), a valve stem displacement, a fluid flow rate, and a fluid pressure (upstream and downstream pressures at the control valve or an upstream/downstream difference pressure at the control valve) are to be detected, the cause of abnormality can be specified to a certain degree, e.g., abnormality caused by a change in flow rate characteristics or abnormality caused by other factors of the control valve.

What is claimed is:

1. A control valve abnormality detection method of detecting abnormality in a control valve constituted by a valve for opening/closing a channel through which a fluid flows, a valve stem having one end coupled to said valve and capable of advancing/retreating in an axial direction, and a valve stem driving device for causing said valve stem to advance/retreat by applying a driving force to the other end of said valve stem, comprising the steps of:

pre-setting a characteristic expression representing a relationship between three factors, in a normal state of said control valve, which consist of a displacement of said valve stem, a driving force from said valve stem driving device which changes upon displacement of said valve stem, and a fluid force of the fluid which acts on one end of said valve stem through said valve;

detecting the three factors on the basis of a measurement result;

calculating, on the basis of two factors selected from the detected three factors, an estimated value of one factor, which is not selected, on the basis of the two selected factors by using the pre-set characteristic expression; and comparing a detected value of one factor, which is not selected, with the calculated estimated value, and determining abnormality in said control valve on the basis of the comparison result.

2. A method according to claim 1, further comprising the steps of:

setting a relation representing a relationship between a fluid force and a flow rate of the fluid;

measuring the flow rate of the fluid; and obtaining a fluid force from the measured flow rate of the fluid by using the set relation.

3. A method according to claim 1, further comprising the steps of:

setting a relation representing a relationship between a fluid force and a control valve upstream/downstream difference pressure of the fluid;

measuring the control valve upstream/downstream difference pressure of the fluid; and obtaining a fluid force from the measured control valve upstream/downstream difference pressure of the fluid by using the set relation.

4. A method according to claim 1, further comprising the steps of:

setting a relation representing a relationship between a fluid force and a control valve upstream and downstream pressures of the fluid;

measuring the control valve upstream and downstream pressures of the fluid; and obtaining a fluid force from the measured control valve upstream and downstream pressures of the fluid by using the set relation.

5. A method according to claim 1, further comprising the steps of:

setting a relation representing a relationship between a fluid force and a control valve upstream pressure of the fluid;

measuring the control valve upstream pressure of the fluid; and obtaining a fluid force from the measured control valve upstream pressure of the fluid by using the set relation.

6. A method according to claim 1, further comprising the steps of:

setting a relation representing a relationship between a fluid force and a control valve downstream pressure of the fluid;

measuring the control valve downstream pressure of the fluid; and obtaining a fluid force from the measured control valve downstream pressure of the fluid by using the set relation.

7. A control valve abnormality detection apparatus for detecting abnormality in a control valve constituted by a valve for opening/closing a channel through which a fluid flows, a valve stem having one end coupled to said valve and capable of advancing/retreating in an axial direction, and a valve stem driving device for causing said valve stem to advance/retreat by applying a driving force to the other end of said valve stem, comprising:

storage means in which a characteristic expression representing a relationship between three factors, in a normal state of said control valve, which consist of a displacement of said valve stem, a driving force from said valve stem driving device which changes upon displacement of said valve stem, and a fluid force of the fluid which acts on one end of said valve stem through said valve is stored in advance;

displacement detecting means for detecting the displacement of said valve stem on the basis of a measurement result;

driving force detecting means for detecting a driving force from said valve stem driving means on the basis of the measurement result;

fluid state detecting means for detecting a fluid force on the basis of the measurement result;

estimated value calculating means for calculating, on the basis of two factors selected from the three factors obtained from said displacement detecting means, said driving force detecting means, and said fluid state detecting means, an estimated value of one factor, which is not selected, by using the characteristic expression stored in said storage means; and comparing means for comparing the detected value of one factor, which is not selected, with the estimated value obtained by said estimated value calculating means, and determining abnormality in said control valve on the basis of the comparison result.

8. An apparatus according to claim 7, further comprising flow rate detecting means for detecting a flow rate of the fluid, and wherein said fluid state detecting means comprises a memory in which a relation representing a relationship between a fluid force and the flow rate of the fluid is stored in advance, and obtains the fluid force from the flow rate of the fluid, obtained by said flow rate detecting means, by using the stored relation.

9. An apparatus according to claim 7, further comprising pressure detecting means for detecting a control valve upstream/downstream difference pressure of the fluid, and wherein said fluid state detecting means comprises a memory in which a relation representing a relationship between a fluid force and the control valve upstream/downstream difference pressure of the fluid is stored in advance, and obtains the fluid force from the control valve upstream/downstream difference pressure of the fluid, obtained by said pressure detecting means, by using the stored relation.

10. An apparatus according to claim 7, further comprising pressure detecting means for detecting a control valve upstream and downstream pressures of the fluid, and wherein said fluid state detecting means comprises a memory in which a relation representing a relationship between a fluid force and the control valve upstream and downstream pressures of the fluid is stored in advance, and obtains the fluid force from the control valve upstream and downstream pressures of the fluid, obtained by said pressure detecting means, by using the stored relation.

11. An apparatus according to claim 7, further comprising pressure detecting means for detecting a control valve upstream pressure of the fluid, and wherein said fluid state detecting means comprises a memory in which a relation representing a relationship between a fluid force and the control valve upstream pressure of the fluid is stored in advance, and obtains the fluid force from the control valve upstream pressure of the fluid, obtained by said pressure detecting means, by using the stored relation.

12. An apparatus according to claim 7, further comprising pressure detecting means for detecting a control valve downstream pressure of the fluid, and wherein said fluid state detecting means comprises a memory in which a relation representing a relationship between a fluid force and the control valve downstream pressure of the fluid is stored in advance, and obtains the fluid force from the control valve downstream pressure of the fluid, obtained by said pressure detecting means, by using the stored relation.

* * * * *

UNITED STATES PATENT AND TRADEMARK OFFICE
CERTIFICATE OF CORRECTION

PATENT NO. : 5,758,686
DATED : June 2, 1998
INVENTOR(S) : Ohtsuka et al.

It is certified that error appears in the above-identified patent and that said Letters Patent is hereby corrected as shown below:

<u>Title page,</u>
Item [21], Application Number, please delete "864,846" and insert -- 08/864,846 --.

Signed and Sealed this

Eleventh Day of December, 2001

*Attest:*

*Attesting Officer*

NICHOLAS P. GODICI
*Acting Director of the United States Patent and Trademark Office*